United States Patent
Wang et al.

(10) Patent No.: US 9,436,790 B1
(45) Date of Patent: Sep. 6, 2016

(54) SYSTEMS AND METHODS FOR INTEGRATED CIRCUIT DESIGN

(71) Applicant: Marvell International Ltd., Hamilton (BM)

(72) Inventors: Jun Wang, Beijing (CN); Jun Chao, Beijing (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 29 days.

(21) Appl. No.: 14/541,839

(22) Filed: Nov. 14, 2014

Related U.S. Application Data (60) Provisional application No. 61/908,365, filed on Nov. 25, 2013.

(51) Int. Cl.
| | |
|---|---|
| *G06F 17/50* | (2006.01) |
| *H01L 23/535* | (2006.01) |
| *G06F 1/32* | (2006.01) |
| *G06F 1/26* | (2006.01) |
| *H03K 19/00* | (2006.01) |
| *H03K 19/003* | (2006.01) |
| *G06F 1/16* | (2006.01) |

(52) U.S. Cl.
CPC .......... *G06F 17/5072* (2013.01); *H01L 23/535* (2013.01); *G06F 1/16* (2013.01); *G06F 1/26* (2013.01); *G06F 1/3243* (2013.01); *H03K 19/0013* (2013.01); *H03K 19/00315* (2013.01)

(58) Field of Classification Search
CPC .......... G06F 1/16; G06F 1/26; G06F 1/3243; G06F 17/5072; H03K 19/0013; H03K 19/00315; H01L 23/535
USPC .......................................................... 716/133
See application file for complete search history.

(56) References Cited

U.S. PATENT DOCUMENTS

| | | | | |
|---|---|---|---|---|
| 5,483,176 A * | 1/1996 | Rodriguez | ......... | H03K 19/0013 326/21 |
| 5,852,370 A * | 12/1998 | Ko | ..................... | H03K 19/0013 326/68 |
| 5,870,617 A * | 2/1999 | Walsh | ....................... | G06F 1/26 713/324 |
| 7,463,057 B1 * | 12/2008 | Rahim | ............... | H03K 19/1776 326/113 |
| 7,610,571 B2 * | 10/2009 | Chen | ................... | G06F 17/5022 716/109 |
| 7,669,165 B2 * | 2/2010 | Pandey | ............... | G06F 17/5045 716/109 |
| 7,739,629 B2 * | 6/2010 | Wang | .................... | G06F 17/505 703/14 |
| 8,117,581 B1 * | 2/2012 | Li | ....................... | G06F 17/5072 716/120 |
| 8,176,453 B2 * | 5/2012 | Yang | ................... | G06F 17/5022 716/106 |

(Continued)

*Primary Examiner* — Helen Rossoshek (57) ABSTRACT

System and methods are provided for integrated circuit design. An initial layout including first circuit units is generated, at least part of the first circuit units obtaining power from a first power supply structure. Second circuit units that obtain power from a second power supply structure are determined, the second circuit units being included in the first circuit units. The second circuit units are grouped. The grouped second circuit units are connected to form one or more grids. The one or more grids are connected to the second power supply structure.

15 Claims, 5 Drawing Sheets

(56) References Cited

U.S. PATENT DOCUMENTS

| | | | | |
|---|---|---|---|---|
| 8,386,980 B2* | 2/2013 | Murray | G06F 17/505 | 716/119 |
| 8,392,862 B1* | 3/2013 | Siguenza | G06F 17/505 | 716/120 |
| 8,607,177 B2* | 12/2013 | Verbeure | G06F 17/505 | 713/322 |
| 9,245,593 B2* | 1/2016 | Ishizu | G06F 1/3243 | |
| 2008/0023792 A1* | 1/2008 | Liu | G06F 17/5072 | 257/532 |
| 2009/0113370 A1* | 4/2009 | Yoshinaga | G06F 17/5072 | 716/119 |
| 2009/0259982 A1* | 10/2009 | Verbeure | G06F 17/505 | 716/129 |
| 2010/0192115 A1* | 7/2010 | Yang | G06F 17/5022 | 716/104 |
| 2010/0246152 A1* | 9/2010 | Lin | G06F 1/16 | 361/783 |
| 2011/0061032 A1* | 3/2011 | Kojima | G06F 17/505 | 716/104 |
| 2011/0320991 A1* | 12/2011 | Hsu | G06F 17/5022 | 716/103 |
| 2012/0274356 A1* | 11/2012 | Takahashi | H01L 27/1225 | 326/46 |
| 2014/0181769 A1* | 6/2014 | Verbeure | G06F 17/505 | 716/109 |
| 2015/0135155 A1* | 5/2015 | Yoshizawa | G06F 17/5054 | 716/117 |
| 2015/0332754 A1* | 11/2015 | Campbell | G11C 5/143 | 365/154 |

* cited by examiner

SYSTEMS AND METHODS FOR INTEGRATED CIRCUIT DESIGN

CROSS-REFERENCE TO RELATED APPLICATIONS

This disclosure claims priority to and benefit from U.S. Provisional Patent Application No. 61/908,365, filed on Nov. 25, 2013, the entirety of which is incorporated herein by reference.

FIELD

The technology described in this patent document relates generally to integrated circuits and more particularly to integrated circuit design.

BACKGROUND

Low power integrated circuit (IC) design becomes more and more important in various applications. Integrated circuits may include multiple blocks. Some blocks in the integrated circuit are often shut down when they are not actively in use to reduce leakage power. However, under some circumstances, certain circuit units within these blocks that are to be shut down may need to stay power-on. For example, certain buffers need to be powered on for some signals (e.g., power switch control signals, clock signals, feed through signals, etc.). In addition, isolation cells or level shifters often need to be powered on.

SUMMARY

In accordance with the teachings described herein, system and methods are provided for integrated circuit design. An initial layout including first circuit units is generated, at least part of the first circuit units obtaining power from a first power supply structure. Second circuit units that obtain power from a second power supply structure are determined, the second circuit units being included in the first circuit units. The second circuit units are grouped. The grouped second circuit units are connected to form one or more grids. The one or more grids are connected to the second power supply structure.

In one embodiment, a system for integrated circuit design includes: one or more data processors; and a computer-readable storage medium encoded with instructions for commanding the one or more data processors to execute certain operations. An initial layout including first circuit units is generated, at least part of the first circuit units obtaining power from a first power supply structure. Second circuit units that obtain power from a second power supply structure are determined, the second circuit units being included in the first circuit units. The second circuit units are grouped. The grouped second circuit units are connected to form one or more grids. The one or more grids are connected to the second power supply structure.

In another embodiment, an integrated circuit includes: first circuit units, at least part of the first circuit units being configured to obtain power from a first power supply structure; and second circuit units in one or more groups, the second circuit units being included in the first circuit units. The second circuit in the one or more groups are connected to form one or more grids. The one or more grids are connected to the second power supply structure.

DETAILED DESCRIPTION

Many approaches have been used to ensure some circuit units (e.g., cells) within certain blocks of an integrated circuit to stay power-on even if these blocks are to be shut down for not being actively in use. For example, a special power supply region within the blocks may be created to keep these circuit units power-on. However, such an approach may increase the difficulty of implementation (e.g., power structures). Alternatively, secondary power pins may be implemented in the circuit units that need to stay power-on. While standard circuit units in the integrated circuit may obtain power from a standard power supply structure (e.g., metal 1 power rails), the circuit units that need to remain power-on obtain power through the secondary power pins from a secondary power supply structure. However, the secondary power pins often need additional routing resources. In addition, high voltage drops may occur due to weakly connected secondary power routing, which may cause timing issues and functionality problems. For example, a single secondary power connection wire may need to support 12 or 16 circuit units cells), resulting in serious voltage drops and electrical-migration problems. Furthermore, in subsequent circuit design stages, additional circuit units that need secondary power connection may be added to fix timing violations. Few routing spaces may be left for secondary power routing. Then, longer wires and smaller vias may have to be used, which may cause even higher voltage drops.

Figure 1A:
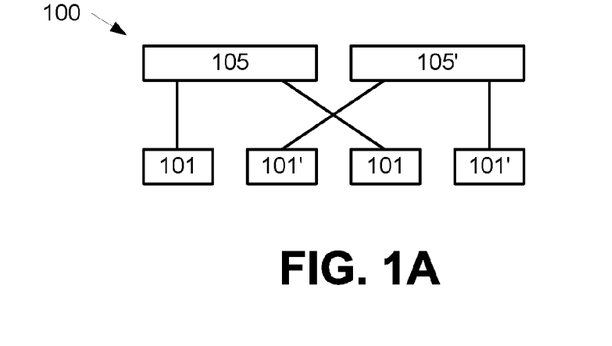
FIG. 1A is a schematic view of an example integrated circuit.
Figure 1B:
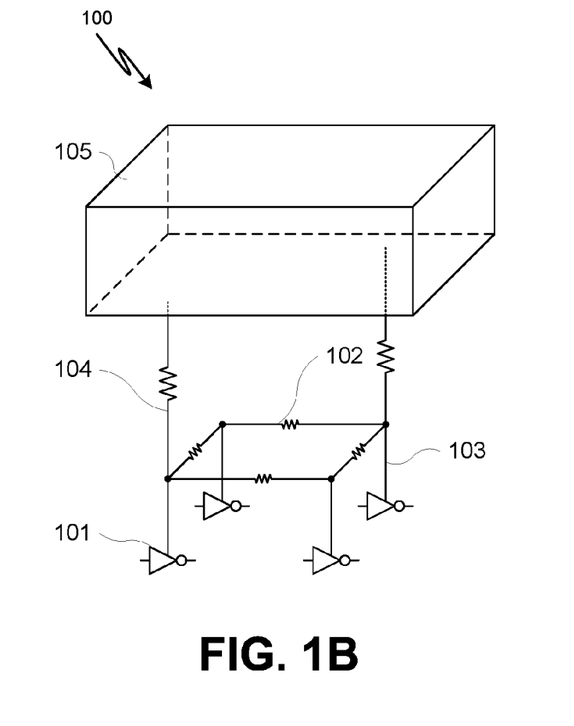
FIG. 1B depicts an example diagram showing certain circuit units with second power supply connections.

FIGS. 1A and 1B depict an example diagram showing certain circuit units with secondary power supply connections. A small group of second circuit units 101 included in an integrated circuit 100 are configured to obtain power from a second power supply structure 105.

Specifically, the second circuit units 101 that include secondary power pins are connected (e.g., through horizontal metal wires 102 and vertical wires 103) to form a grid which is connected to the second power supply structure 105 through cross-layer connections 104 (e.g., metal wires). For example, the number of the cross-layer connections 104 is determined by the number of the second circuit units 101. As an example, the number of the cross-layer connections 104 is no larger than half of the number of the second circuit units 101. The second power supply structure 105 that has a strong current conduction capacity includes one or more power strips (e.g., metal layer strips), in some embodiments. First circuit units 101' in the integrated circuit 100, other than the second circuit units 101, are configured to obtain power from a primary power supply structure 105' (first power supply structure 105') (e.g., metal 1 power rails).

Figure 2:
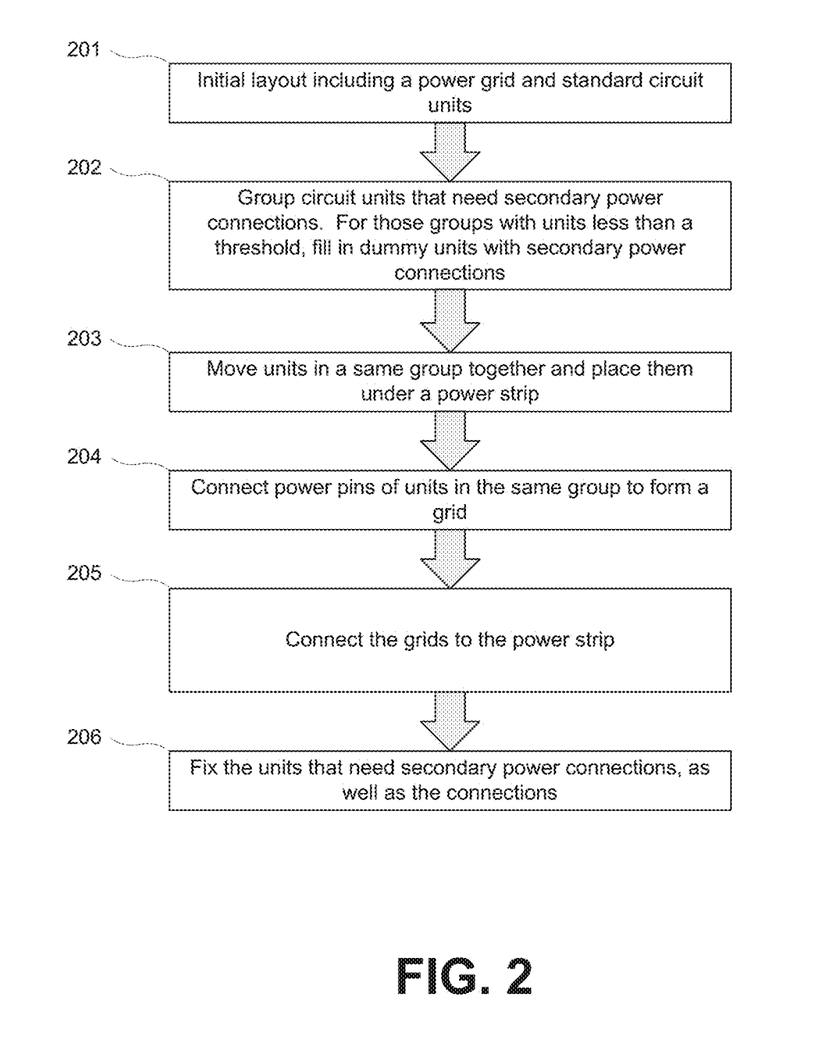
FIG. 2 depicts an example flow chart for circuit design with secondary power connections.

FIG. 2 depicts an example flow chart for circuit design with secondary power connections. As shown in FIG. 2, circuit units that need secondary power supply connections are organized into one or more groups, and circuit units within each group are connected to form one or more grids. The grids are then connected to a second power supply structure.

Specifically, at 201, an initial layout including circuit units and a second power structure (e.g., a power grid) is created after a plane layout. Location information of one or more high-level power strips associated with the second power supply structure 105 is determined. In addition, circuit units (e.g., the second circuit units 101) that need second power supply connections are determined. For example, average power consumption and/or timing margin information may be obtained.

At 202, the second circuit units 101 that need secondary power supply connections (connections to the second power supply 105) are grouped as follows.
a) The second circuit units 101 in a same group may be mutually close and positioned so that when the circuit units are moved from original positions, impact on the timing sequences can be small.
b) If the number of the second circuit units 101 in a particular group is larger than a threshold, the group is divided into smaller groups. For example, the threshold is no more than 9.
c) If most units in a group have high power consumption, the group is divided into smaller groups.

Furthermore, one or more dummy units may be added into a group if the number of the circuit units in the group is less than a threshold. For example, a dummy unit includes a secondary power supply pin. The second power supply pins may be used for optimizing the timing sequence during subsequent design stages. For example, the threshold is 4, 6, 9, etc., depending on an original size of the group. An inverter, a buffer, etc. may be used as the dummy units, in some embodiments.

Figure 3:
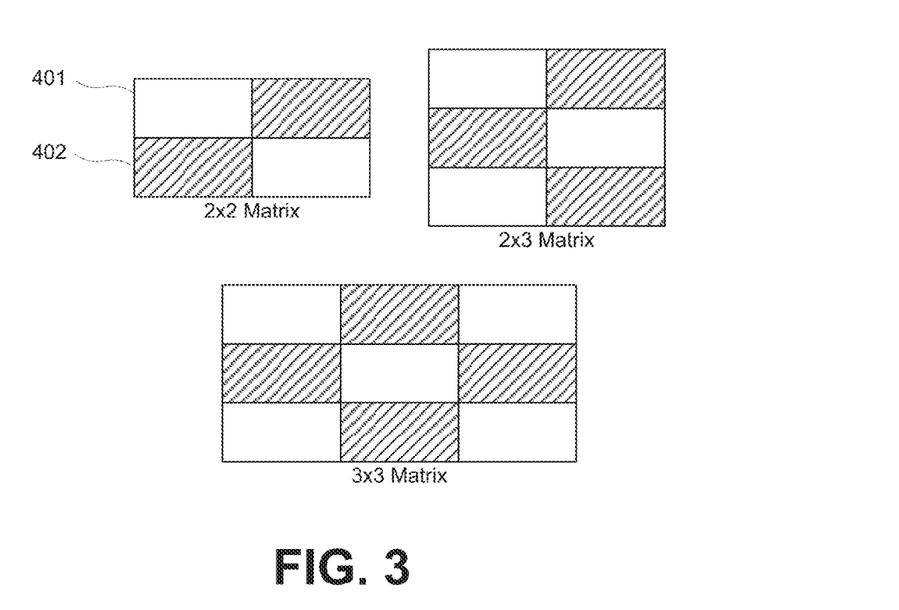
FIG. 3 depicts an example diagram showing grouping circuit units into matrices.
Figure 4:
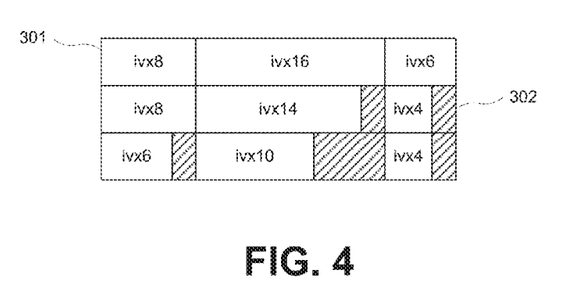
FIG. 4 depicts an example diagram for filling in dummy units into a group of circuit units.

At 203, the circuit units in a group are moved together and arranged below a power strip (e.g., a power belt) to reduce a length of a second power supply connection (e.g., a metal wire). The circuit units are not far from their original positions, and relevant timing paths may not be affected much. In accordance with the size of the group, the circuit units are arranged into a matrix. For example, the circuit units can be grouped into a 2×2 matrix, a 2×3 matrix or a 3×3 matrix, as shown in FIG. 3. In some embodiments, the sizes of the circuit units are often different. To arrange the circuit units into a matrix, a width of each circuit unit may be obtained from a database (e.g., a Liberty library). The circuit units are then divided into different matrices according to the sizes of the circuit units. Thereafter, the circuit units may be arranged line-by-line and aligned with a same edge, as shown in FIG. 4. For example, a feed unit 302 (e.g., a dummy unit) is filled in an empty position.

Referring back to FIG. 2, at 204, the power supply pins of the circuit units in one group are connected (e.g., using metal wires) to form a grid (e.g., as shown in FIG. 1). For example, metal 1 power supply wires are used to connect the circuit units together along a horizontal direction. Metal 2 wires may be used to connect the circuit units together along a vertical direction due to the existence of a horizontal metal 1 power rail. Since the circuit units are arranged close to each other, the connections (e.g., the metal wires) can be very short. The horizontal connections (e.g., the connections 102) and the vertical connections (e.g., the connections 103) form the grid. Different grids may be formed for different groups.

At 205, each formed grid is connected to the power strip (e.g., the structure 105) using cross-layer connections (e.g., the connections 104). The circuit units have been moved under the power strip, and thus the cross-layer connections can be easily constructed. Depending on routing resources, the number of the cross-layer connections can be matched with the number of the circuit units in the group. For example, the number of the cross-layer connections can be reduced to half of the number of the circuit units save the routing resources. As shown in FIG. 3, a specific circuit unit may be connected to the power strip. For example, the circuit unit 402 has a cross-layer connection, while the circuit unit 401 does not have a cross-layer connection. At 206, the circuit units and the power supply connections may be fixed before subsequent design stages to generate a target integrated circuit layout.

Figure 5:
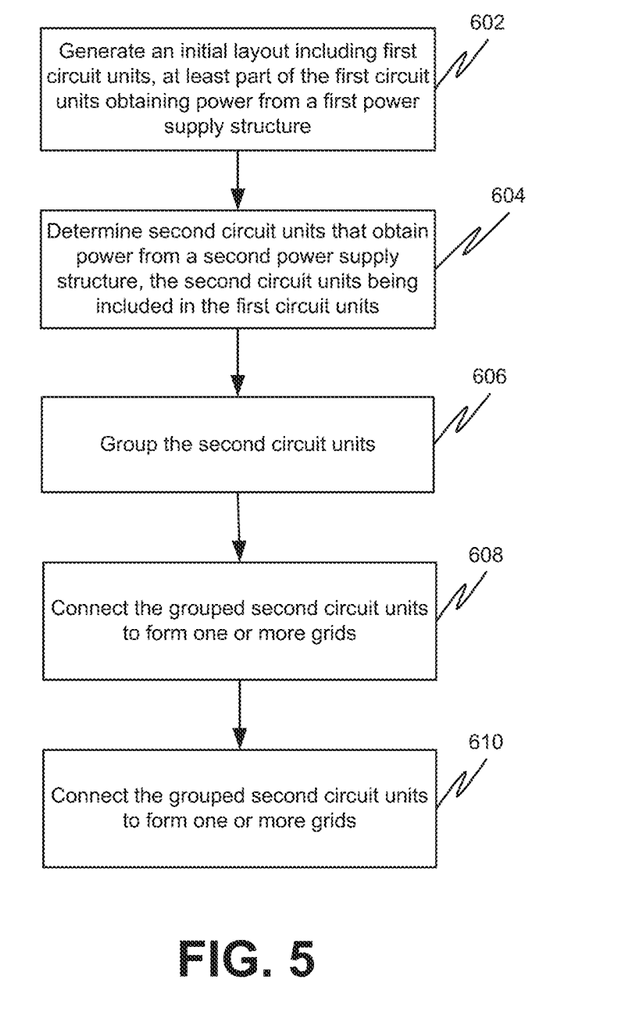
FIG. 5 depicts another example flow chart for circuit design with secondary power supply connections.

FIG. 5 depicts another example flow chart for circuit design with secondary power supply connections. At 602, an initial layout that includes first circuit units is generated, at least part of the first circuit units obtaining power from a first power supply structure. At 604, second circuit units that obtain power from a second power supply structure are determined, the second circuit units being included in the first circuit units. At 606, the second circuit units are grouped. At 608, the grouped second circuit units are connected to form one or more grids. At 610, the one or more grids are connected to the second power supply structure.

As described above, grids formed by connecting grouped circuit units are implemented for secondary power supply connections to reduce effective resistance of power supply connections and thus to reduce voltage drops and electromigration effects. In addition, currents flowing through the grids can be redistributed. Further, the grids are implemented to reduce the number of cross-layer connections so as to reduce the consumption of routing resources. In subsequent design stages, new circuit units that need secondary power supply connections may be added by replacing the dummy units that are inserted into groups with fewer circuit units. In some embodiments, the operation flow as shown in FIG. 2 and/or FIG. 5 may be automatically implemented using a script and may be integrated into a conventional backend design flow.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

This written description provides many different embodiments, or examples, for implementing different features of the invention. Specific examples of components and arrangements are described to simplify the present disclosure. These are, of course, merely examples and are not intended to be limiting. For example, the formation of a first feature over or on a second feature in the description may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "on," "in," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Various features may not be drawn to scale in the figures, and the dimensions of the various features may be arbitrarily increased or reduced for clarity of discussion.

What is claimed is:

1. A method for generating and transforming an integrated circuit design layout, the method comprising:
   generating an initial layout including first circuit units configured to obtain power from a first power supply structure;
   generating second circuit units configured to obtain power from a second power supply structure, the second circuit units being included among the first circuit units;
   movingly grouping the second circuit units spatially together into a matrix configuration that comprises at least two horizontally-extending rows of the second circuit units and at least two horizontally-extending columns of the second circuit units, and wherein the second circuit units are located directly under and vertically below a horizontally-extending conductive layer of the second power supply structure;
   interconnecting the grouped second circuit units with a grid that includes
      for each of the second circuit units, a vertical conductive line extending vertically from the respective second circuit unit, and
      horizontal conductive lines that interconnect the vertical conductive lines; and
   connecting the grid to the second power supply structure with cross-layer connections, in which each of the cross-layer connections extends vertically upward from a respective one of the second circuit units to the conductive layer;
   wherein the generating of the second circuit units, the movingly grouping and the interconnecting are performed by one or more processors.

2. The method of claim 1, wherein the conductive layer is electrically connected to the second power supply structure, or the conductive layer is included in the second power supply structure.

3. The method of claim 1, wherein the vertical and horizontal conductive lines include conductive wires.

4. The method of claim 1, wherein the grouping of the second circuit units includes:
   in response to a total number of the second circuit units exceeding a threshold, dividing the second circuit units into a plurality of groups, a number of the second circuit units included in a group not exceeding the threshold, and each group having a respective grid that (i) interconnects the second circuit units of the respective group and (ii) is separate from the grids of the other groups of the plurality and (iii) is connected by cross-layer connections to the conductive layer of the second power supply structure.

5. The method of claim 4, wherein:
   a first group includes a first number of the second circuit units, the first number being smaller than the threshold; and
   a second number of dummy units are added into the first group so that a sum of the first number and the second number is equal to the threshold.

6. The method of claim 1, wherein the grouping the second circuit units includes:
   in response to a number of the second circuit units being smaller than a threshold,
   assigning the second circuit units into a single group; and
   adding one or more dummy units into the group so that a total number of the second circuit units in the group and the dummy units in the group is equal to the threshold.

7. The method of claim 1, wherein the grouping of the second circuit units includes:
   in response to power consumption of the second circuit units exceeding a threshold, dividing the second circuit units into a plurality of groups, power consumption of the second circuit units in a group not exceeding the threshold, and each group having a respective grid that (i) interconnects the second circuit units of the respective group and (ii) is separate from the grids of the other groups of the plurality and (iii) is connected by cross-layer connections to the conductive layer of the second power supply structure.

8. The method of claim 1, further comprising:
   adjusting the second circuit units and the connections of the one or more grids to the second power supply structure to generate a target layout.

9. A system for generating and transforming an integrated circuit design layout, the system comprising:
   one or more data processors; and
   a non-transitory computer-readable storage medium encoded with instructions for commanding the one or more data processors to execute operations including:
      generating an initial layout including first circuit units configured to obtain power from a first power supply structure;
      generating second circuit units configured to obtain power from a second power supply structure, the second circuit units being included among the first circuit units;
   movingly grouping the second circuit units spatially together into a matrix configuration that comprises at least two horizontally-extending rows of the second circuit units and at least two horizontally-extending columns of the second circuit units, and wherein the second circuit units are located directly under and vertically below a horizontally-extending conductive layer of the second power supply structure;
      interconnecting the grouped second circuit units with a grid that includes
         for each of the second circuit units, a vertical conductive line extending vertically from the respective second circuit unit, and
         horizontal conductive lines that interconnect the vertical conductive lines; and
      connecting the grid to the second power supply structure with cross-layer connections, in which each of the cross-layer connections extends vertically upward from a respective one of the second circuit units to the conductive layer.

10. The system of claim 9, wherein the instructions are adapted to cause the one or more data processors to execute further operation including:
   in response to a total number of the second circuit units exceeding a threshold, dividing the second circuit units into a plurality of groups, a number of the second circuit units included in a group not exceeding the threshold, and each group having a respective grid that (i) interconnects the second circuit units of the respective group and (ii) is separate from the grids of the other groups of the plurality and (iii) is connected by cross-layer connections to the conductive layer of the second power supply structure.

11. The system of claim 10, wherein:
   a first group includes a first number of the second circuit units, the first number being smaller than the threshold; and
   a second number of dummy units are added into the first group so that a sum of the first number and the second number is equal to the threshold.

12. The system of claim 9, wherein the instructions are adapted to cause the one or more data processors to execute further operation including:
   in response to a number of the second circuit units being smaller than a threshold,
      assigning the second circuit units into a single group; and
      adding one or more dummy units into the group so that a total number of the second circuit units in the group and the dummy units in the group is equal to the threshold.

13. The system of claim 9, wherein the instructions are adapted to cause the one or more data processors to execute further operation including:
   in response to power consumption of the second circuit units exceeding a threshold, dividing the second circuit units into a plurality of groups, power consumption of the second circuit units in a group not exceeding the threshold, and each group having a respective grid that (i) interconnects the second circuit units of the respective group and (ii) is separate from the grids of the other groups of the plurality and (iii) is connected by cross-layer connections to the conductive layer of the second power supply structure.

14. An integrated circuit comprising:
   first circuit units configured to obtain power from a first power supply structure; and
   second circuit units grouped into groups and configured to obtain power from a second power supply structure;
   wherein for each group:
      the second circuit units of the group are grouped together in a matrix configuration, of at least two horizontally-extending rows of the second circuit units and at least two horizontally-extending columns of the second circuit units,
      the second circuit units are located directly under and vertically below a horizontally-extending conductive layer of the second power supply structure;
      the second circuit units are interconnected with a grid that includes
         for each of the second circuit units, a vertical conductive line extending vertically from the respective second circuit unit, and
         horizontal conductive lines that interconnect the vertical conductive lines, and
      the grid is connected to the second power supply structure by cross-layer connections, in which each of the cross-layer connections extends vertically upward from a respective one of the second circuit units to the conductive layer.

15. The integrated circuit of claim 14, wherein:
   in each row of the matrix configuration, the cross-layer connections extend from only alternating ones of the second circuit units of the respective row; and
   in each column of the matrix configuration, the cross-layer connections extend from only alternating ones of the second circuit units of the respective column.

* * * * *